(12) United States Patent
Pratt et al.

(10) Patent No.: US 8,515,970 B2
(45) Date of Patent: Aug. 20, 2013

(54) SYSTEMS AND METHODS FOR GENERATING CUSTOMIZED SETTINGS UTILIZING A SOCIAL NETWORK OF PERSONAL PROFILES

(75) Inventors: James Pratt, Round Rock, TX (US); Steven Belz, Cedar Park, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 344 days.

(21) Appl. No.: 12/942,215

(22) Filed: Nov. 9, 2010

(65) Prior Publication Data
US 2012/0117094 A1 May 10, 2012

(51) Int. Cl.
*G06F 7/00* (2006.01)
*G06F 17/30* (2006.01)
*G06F 15/16* (2006.01)

(52) U.S. Cl.
USPC ............ 707/749; 707/734; 707/758; 707/948

(58) Field of Classification Search
USPC .................. 707/749, 734, 758, 948
See application file for complete search history.

(56) References Cited

U.S. PATENT DOCUMENTS

| | | | |
|---|---|---|---|
| 2003/0158897 A1* | 8/2003 | Ben-Natan et al. | 709/204 |
| 2005/0132014 A1* | 6/2005 | Horvitz et al. | 709/206 |
| 2009/0012988 A1* | 1/2009 | Brown | 707/102 |
| 2009/0019061 A1* | 1/2009 | Scannell, Jr. | 707/10 |
| 2009/0030933 A1* | 1/2009 | Brezina et al. | 707/102 |
| 2010/0312724 A1* | 12/2010 | Pinckney et al. | 707/769 |
| 2010/0318425 A1* | 12/2010 | Karanjia et al. | 707/769 |
| 2011/0270813 A1* | 11/2011 | Cok et al. | 707/705 |
| 2012/0102050 A1* | 4/2012 | Button et al. | 707/749 |

* cited by examiner

*Primary Examiner* — Greta Robinson
*Assistant Examiner* — Brian E. Weinrich
(74) *Attorney, Agent, or Firm* — Parks IP Law LLC; Jennifer P. Medlin, Esq.

(57) ABSTRACT

A system for providing a recommended customized profile to a subject member of a social network for use in operating a subject customizable apparatus is described. The system includes a social network database storing profiles of members of the social network corresponding to multiple customizable apparatus including the subject customizable apparatus. The system also includes a central social network server having a processor and a tangible, non-transitory computer-readable medium storing instructions that, when executed by the processor, cause the processor to generate the recommended customized profile, for use by the subject member in operation of the subject customizable apparatus, based on at least one matching profile of other members in the social network.

20 Claims, 6 Drawing Sheets

CUSTOMIZABLE APPARATUS

SOCIAL NETWORK DATABASE

SYSTEMS AND METHODS FOR GENERATING CUSTOMIZED SETTINGS UTILIZING A SOCIAL NETWORK OF PERSONAL PROFILES

TECHNICAL FIELD

The present disclosure relates generally to systems and methods for generating customized settings and, more particularly, to systems and methods for generating customized settings, for an adjustable apparatus, utilizing a social network of personal profiles.

BACKGROUND

With advancements in technology, individuals are able to personalize a multitude of personal devices. Regarding smart phones, for example, users can program their phone to have specified ringtones, voicemail features, and visual presentations.

As another example of personalization, modern automobiles have a wide variety of features that can be personalized to the user. For instance, a driver can establish preferred seat-position settings, which can be effectuated by the press of a seat-settings button usually found on an outside of the seat cushion. Some vehicles further allow users to establish two seat-position settings, such as a setting for a first person commonly driving the vehicle and one for a second person who also drives the vehicle.

SUMMARY

The present disclosure relates to a system for providing a recommended customized profile to a subject member of a social network for use in operating a subject customizable apparatus. The system includes a social network database storing profiles of members of the social network corresponding to multiple customizable apparatus including the subject customizable apparatus. The system also includes a central social network server having a processor and a tangible, non-transitory computer-readable medium storing instructions that, when executed by the processor, cause the processor to generate the recommended customized profile, for use by the subject member in operation of the subject customizable apparatus, based on at least one matching profile of other members in the social network.

In another aspect, the present disclosure relates to a customizable apparatus for use by a subject member of a social network. The apparatus includes at least one customizable feature, a processor operatively connected to the customizable feature for controlling a setting of the customizable feature, and a tangible, non-transitory computer-readable medium. The medium stores instructions that, when executed by the processor, cause the processor to perform steps including: determine that a setting is not available for the customizable features in connection with the subject member, and generate a request for a recommended customized profile for the subject member. The steps also include transmitting the request to a social network server, receiving the requested recommended customized profile, and implementing the recommended customized profile for the at least one customizable features.

In yet another aspect, the present disclosure relates to a computer-implemented method for providing a recommended customized profile to a subject member of a social network for use by the subject member in operating a subject customizable apparatus. The method includes a processor, in executing computer-readable instructions stored on a tangible, non-transitory computer-readable medium, generating the recommended customized profile, for use by the subject member in operation of the subject customizable apparatus, based on at least one matching profile of other members in the social network.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

I. Overview of the Disclosure

In various embodiments, the present disclosure relates to systems generating customized profiles for a member of a social network based on matching profiles in the social network. In some embodiments a central server stores the profiles of social network members and algorithms for generating a recommended customized profile in response to a request for the same. In some embodiments, the customized settings are generated based on similarities between one or more profile characteristics of the requesting member and characteristics of other network members.

II. System Architecture

Figure 1:
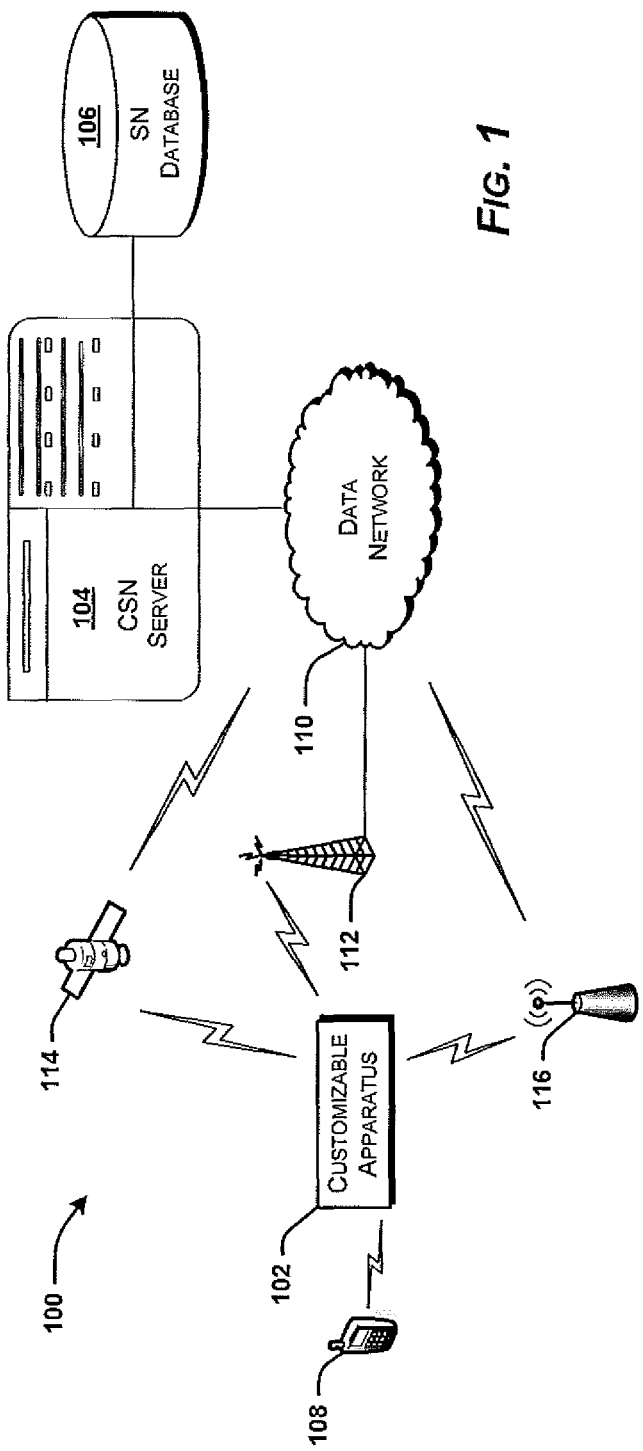
FIG. 1 illustrates a system for generating and delivering customized settings to an adjustable apparatus used by a member of a social network, according to an embodiment.

Turning now to the figures, and more particularly to the first figure, FIG. 1 shows an exemplary system 100 for generating and delivering customized settings to an adjustable or customizable apparatus 102 used by a member of a social network. The system 100 includes a centralized social network social network(CSN) server 104 configured to generate and deliver the customized settings.

The system 100 also includes a social network data store, or database 106 storing profile information corresponding to members of the social network. In operation, the CSN server 104 processes member profiles obtained from the database 106 for generating the customized settings, as described in detail below. The SN database 106 may be positioned with respect to the CSN server 104 in any of a variety of ways including any one or more of (1) the SN database 106 or portions thereof being maintained in the CSN server 104 or portions thereof, (2) the SN database 106 or portions thereof being separate from but closely co-located (e.g., same building room) with the CSN server 104 or portions thereof, and (3) the SN database 106 or portions thereof being maintained remote to the CSN server 104 or portions thereof.

The customizable apparatus 102 may be any of a wide variety of customizable apparatus used by the social network member. By way of example, the customizable apparatus 102 is described as a transportation vehicle, and particularly as an automobile. An exemplary customizable device 102 is shown in greater detail in FIG. 3.

Exemplary customizable settings for automobiles relate to seat positions, seat temperatures, heating, ventilating, and air conditioning (HVAC), a vehicle-component temperature setting (e.g., seat base cushion temperature, window defrost settings, etc.), mirror, window, or camera settings, navigation-related features, radio settings, steering-wheel position, and voice-recognition applications. As another example, for automotive applications or otherwise, customizable features could include media settings, such as channel settings on a radio.

The customizable apparatus 102 in some embodiments is configured to (1) authenticate the social network member to the apparatus 102, such as by radio-frequency identification (RFID) authentication, and/or CSN Server 104, (2) request a customized setting from the CSN server 104, (3) receive a customized setting from the CSN server 104, and (4) implement the customized setting.

In some embodiments, the customizable apparatus 102 is configured to generate the customized setting based on social network data stored on the apparatus. The social network data could include, for instance, a profile of the particular social network member and profiles of other members of the social network, the profiles including at least one personalized setting for the corresponding members.

With continued reference to FIG. 1, the system 100, in some embodiments, further includes a mobile communication device 108, such as a smart phone, dedicated navigation device, or electronic key fob. In some embodiments, at least one of the customizable apparatus 102 and the mobile communication device 108 are configured to communicate with the CSN server 104 by way of a data network 110. The data network 110 may include any one or more of various networks, such as the Internet.

In some embodiments, at least one of the customizable apparatus 102 and the mobile communication device 108 communicates with the data network 110 by way of a cellular communications network 112, including a radio access network (e.g., base station, NodeN, or eNodeB). The cellular network 112 is configured to communicate wirelessly with the customizable apparatus 102 and the mobile communication device 108. The cellular network 112 communicates with the data network 110 wirelessly and/or by wire line, and via standard cellular system infrastructure, such as a mobile switching centers.

Exemplary telecommunications standards include Global System for Mobile communications (GSM) and a Universal Mobile Telecommunications System (UMTS). It should be understood, however, alternatively or additionally, the systems, devices, methods, and computer program products may be implemented in wireless networks that use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

In some embodiments, the customizable apparatus 102 and the mobile communication device 108 are configured to communicate with the data network 110 by way of at least one of a satellite system 114 and other wireless transceiver(s) 116. Exemplary other wireless transceivers include wireless access points, such as BLUETOOTH, WI-FI, or similar technologies, mobile wireless transceivers, such as transceivers in another automobile (i.e., vehicle-to-vehicle (V2V) communication), vehicle-to-road-side infrastructure (V2I communication), or vehicle to any wireless transceiver (V2X communication). These alternate communication paths, such as via another transceiver 116 can be instrumental, for example, in scenarios in which coverage of one or more primary paths of communication (e.g., cellular communications) are for one reason or another not reliably available at the time.

In some implementations, at least one of the satellite system 114 and the other wireless transceiver(s) 116 communicates with the data network 110 by way of the cellular communications network 112.

Like the customizable apparatus 102, the mobile communication device 108 is in some embodiments configured to perform one or more functions of the present disclosure such as by storing and processing a local program component of the algorithm of the present disclosure. Exemplary functions of the mobile communication device 108 include (i) registering the social network member to the customizable apparatus 102, such as by RFID authentication, and/or to the CSN Server 104, (ii) requesting a customized setting, such as of the CSN server 104, (iii) receiving a customized setting, such as from the CSN server 104, and (iv) implementing or initiating implementation of the customized setting.

In some embodiments, the customizable apparatus 102 and/or the mobile communication device 108 are configured to perform any of the steps of the disclosure without interaction with a remote server. These embodiments are especially useful when, for example, access to long-range communications, directly and indirectly (e.g., via a local access point), is for one reason or another not reliably available. For these embodiments, a complete or partial set of applicable data from the social network database 106 is obtained by the acting device (e.g., the customizable apparatus 102 or the mobile device 108), such as by receiving it from the social network server 104. The data may be limited to a particular apparatus and/or data related to apparatus used by the subject member. Regarding the latter, for instance, it is contemplated that the mobile device 108 could include social network data selected based on affinity relationships between the profiles of the user of the device 108 and profiles of other members having a profile for the same or similar apparatus(es). Thus, for instance, if a member drives (e.g., has profiles for) vehicles A and B, the partial data may relate to vehicles A and B, but also vehicles C and D, which are recognized as being vehicle commonly driven by members also driving (having profiles for) vehicles A and B. The social network server 104 may provide the complete or partial database information to the apparatus 102 or mobile device 108, such as in response to request for the same from the apparatus 102 or device 108.

Thus, in some embodiments, the mobile communication device 108 is configured to generate the customized setting based on social network data stored on the device. The social network data could include, for instance, a profile of the particular social network member and profiles of other members of the social network, the profiles including at least one personalized setting for the corresponding members.

And in some embodiments, the customizable apparatus 102 includes a local component of a computer program configured to perform steps of the methods described herein. The program is stored in a tangible, non-transitory computer-readable medium of the apparatus 102 and executed by a processor of the apparatus, such as a memory and a processor of an onboard computer of an automobile.

The customizable apparatus 102 has one or more features capable of adjustment to personalized settings. In some embodiments, it is preferred that these features (e.g., automobile seat positions) are automatically adjustable. Automatic adjustment could be made, for example, by an actuator, servo, micro motor, electric motor, or other standard mechanism configured to convert an instruction or other input into the personalized adjustment. The automatic adjustment may be controlled by, for example, a computer, microprocessor, other integrated-circuit system, application programming interface (API), or other controller implementing settings received from the CSN Server 104. In some embodiments, such controller is onboard the apparatus 102.

In one embodiment, the adjustments are initiated and/or made by the social network member. For instance, a customized setting is communicated from the CSN Server 104 to the member, such as by way of a display screen of the customizable apparatus 102 or the mobile device 108, and the member makes or initiates implementation of the customized setting, such as by personally making or initiating the adjustment, such as manually or by voice input.

Although the system 100 of the present disclosure is described primarily with respect to automobiles, the system 100 may be used in connection with other vehicles of transportation, as well as with non-automotive apparatus. Other exemplary apparatus include, but are not limited to, mobile phones and other transportation vehicles, such as aircraft and rail transportation. Regarding the other transportation vehicles, for instance, the settings could relate to a seat or bed setting, a temperature setting, a lighting setting, an audio-visual or multi-media setting, such as settings for in-flight entertainment, such as radio and television channels and games. Other contemplated exemplary apparatus include beds and chairs, such as beds in a member's home or used by the member when visiting a hotel, and customizable office chairs.

III. Centralized Social Network Server

Figure 2:
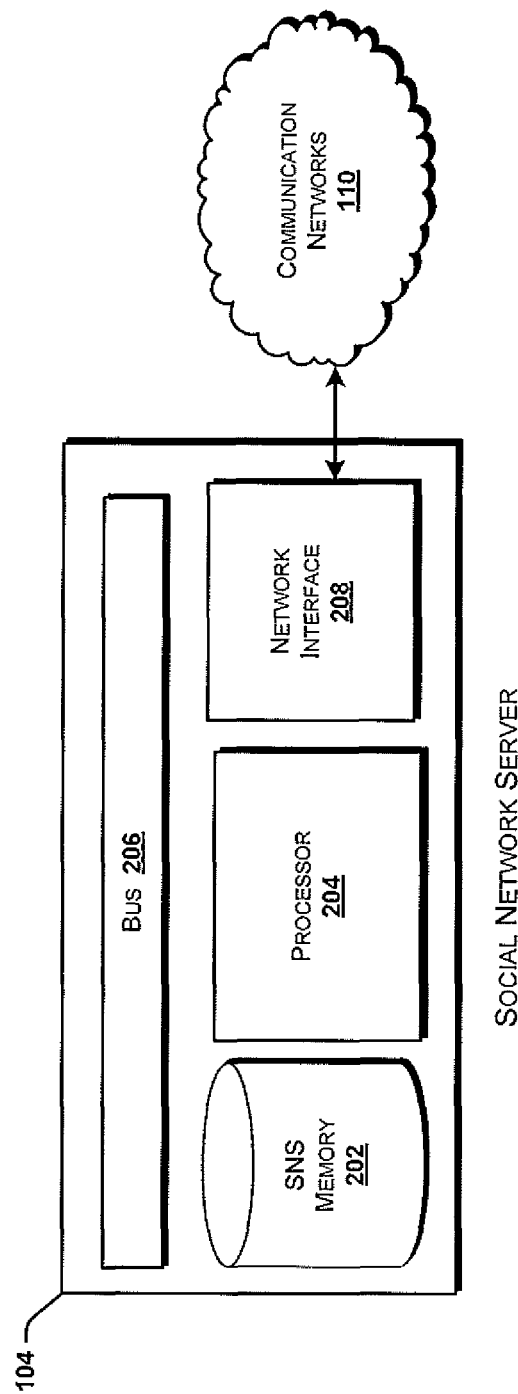
FIG. 2 illustrates a schematic block diagram of a centralized social network server of the system shown in FIG. 1, according to an embodiment of the present disclosure.

FIG. 2 shows the centralized social network (CSN) server 104 of FIG. 1 in more detail according to an embodiment of the present disclosure. Although a single server is illustrated in FIGS. 1 and 2, multiple co-located and/or remote servers can be used to perform the described functions.

The CSN server 104 includes at least one CSN server memory 202 and at least one CSN server processor 204 in communication with the memory 202 via a data bus 206. The memory 202 includes one or more storage modules storing computer-readable instructions executable by the processor 204 to perform the functions of the CSN server 202 described herein.

In various embodiments, the CSN server memory 202 is separate from and connected to the CSN server 104, such as wirelessly and/or by wire line.

The CSN server 104 also includes a network interface 208 by which the CSN processor 102 communicates via the data bus 206 with the data network 110. For embodiments in which the SN database 106 (of FIG. 1), or a portion thereof is remote to the CSN server 104, the server could also connect to the SN database 106 by way of the network interface 208.

IV. Social Network Database

Figure 3:
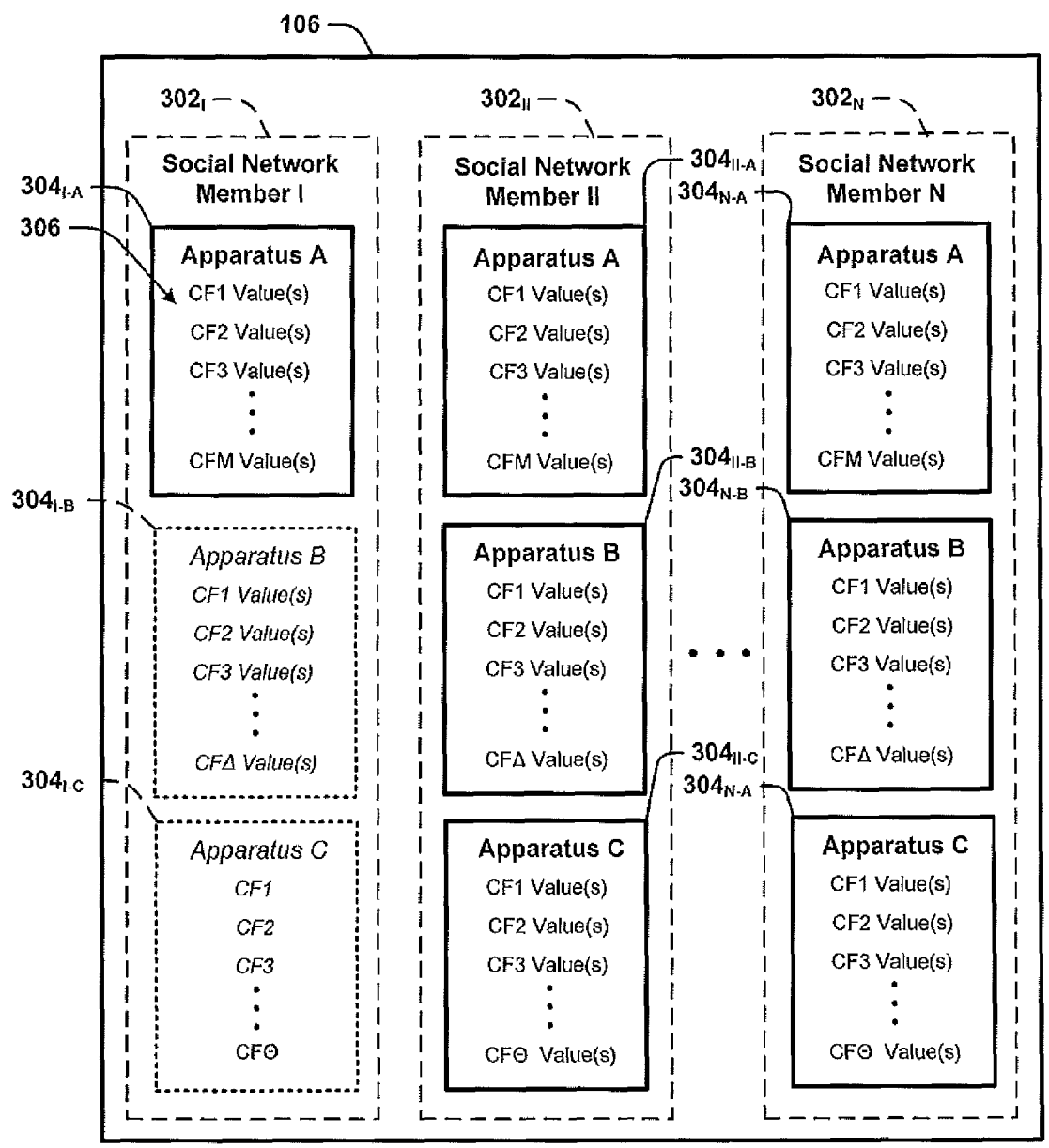
FIG. 3 illustrates a schematic block diagram of exemplary data of the social network database of the system shown in FIG. 1, according to an embodiment of the present disclosure.

FIG. 3 illustrates schematically exemplary data within the server network (SN) database 106 shown in FIG. 1. As provided, the SN database 106, or at least one portion thereof, may be positioned with respect to the CSN server 104, or portions thereof, in any of a variety of ways. For instance, the SN database 106 or a portion thereof may be a part of the CSN server 104, such as by being a part of the CSN memory 202.

As show in FIG. 3, the SN database 106 includes a data module $302_I, 302_{II}, \ldots, 302_N$, corresponding to each member of the social network, where N is a positive integer representing a number of members in the network. Each member data module 302 includes one or more profiles 304. Each of the illustrated profiles 304 identifies characteristics 306 of the member I, II, . . . , N, with respect to customizable Apparatus A, B, C, etc. The characteristics 306 include values, or settings, for adjustable or customizable features CF of the customizable apparatus.

Each member may be associated in the database 106 with a unique identifying indicium. In one embodiment, the indicia include an identification specific to the present social network system 100. In one embodiment, the indicium includes an identification associated with a member's phone, such as a subscriber identity module (SIM) identifier (e.g., integrated circuit card id (ICCID)), a cellular communication plan account number, or the like. The subject member can communicate their indicium to the apparatus 102 or other device (e.g., mobile device 108) in a variety of ways, as provided herein (e.g., short-range radio, keypad, etc.).

In some embodiments, each Apparatus A, B, C, etc., is a different version of the same type of customizable apparatus 102. For instance, in one example, each Apparatus A, B, C, etc. is a different make or model of automobile.

The server 104 may, in arranging information in the database 106, group data in any of a variety of ways without departing from scope of the present invention. For instance, the data may be grouped according to members and/or by apparatus. The data could also be grouped by apparatus type, so that, for instance, two different vehicle models are grouped together for purposes of generating recommended customized profiles because the models are sufficiently similar.

Data could also be grouped by settings for use in generating the recommended profile. For instance, two settings in member profiles of the social network for a first model vehicle could be considered when generating corresponding settings for a subject member regarding a second vehicle due to a determined relevance, but three other settings in profiles of the social network for the same first vehicle are not considered in generating the second vehicle recommended profile because the features related to the three settings are not sufficiently similar across the models.

As an example of data module 302 composition, with respect to the primary, vehicular example, each Apparatus A, B, C, etc., could be a certain automobile. For instance, Apparatus A could be a certain sports-utility vehicle, such as a Toyota 4Runner, Apparatus B, another automobile, such as a Honda CRV, Apparatus C, another, and so on. The characteristics 306 include values for customizable features CF of the vehicles, such as seat positions, seat temperatures, heating, ventilating, and air conditioning (HVAC) setting, navigation-related features, radio settings, and settings of a voice-recognition application.

Each apparatus A, B, C, etc., may have any number of characteristics 306 in common. For instance, Apparatus A may include a feature, such as a thigh-support position setting, that is not a customizable feature of Apparatus B and/or Apparatus C. With reference to FIG. 3, the data corresponding to Apparatus A in each member data module 302 includes customizable features 1, 2, 3, . . . , M, while the data corresponding to Apparatus B in each member data module 302 includes customizable features 1, 2, 3, . . . , $\Delta$, and Apparatus C has customizable features 1, 2, 3, . . . , □. By the illustrated example, the apparatus A, B, C, have some features in common (e.g., 1, 2, 3), and other features distinctly (e.g., M, $\Delta$, □).

In a contemplated embodiment, the member modules 302 may include one or more interim profiles $304_{I-C}$, $304_{I-C}$, as illustrated by dotted lines in FIG. 3. For instance, the interim profile $304_{I-B}$ may be, for example, a recommended customized profile that has been pre-generated by the CSN server 104 and/or other system computing resource (e.g., the mobile device 108) in accordance with the methods described below, in anticipation of a potential request from or scheduled data push to the corresponding member I for use in connection with Apparatus B.

The stored interim profiles $304_{I-B}$, $304_{I-C}$, $304_{N-B}$ could be those being provided to the respective apparatus or member as a recommended customized profile, but not finalized. In various contemplated embodiments, finalizing a profile is triggered in any of various circumstances, such as (i) the member using the recommended customized profile performing an acceptance action, before or after such use, confirming that the recommended customized profile is acceptable (e.g., ergonomically comfortable) to the member, or (ii) the member using the recommended customized profile and not changing it for a certain period (e.g., for one day, one week, or one operation of the subject apparatus). In another exemplary case (iii) in which the member further customizes a recommended customized profile, the further customization would be saved in the data module 302 for the member as a finalized profile 304.

In another contemplated embodiment, the CSN server 104 and/or other system computing resource (e.g., the mobile device 108) maintain a substantially blank or only partially populated profile in the database 106 as a place holder for profiles to be established. FIG. 3 shows a placeholder profile $304_{I-C}$, regarding the third Apparatus C in the data module $302_I$ for the first Member I, as an example of a partially populated interim profile.

V. Exemplary Customizable Apparatus

Figure 4:
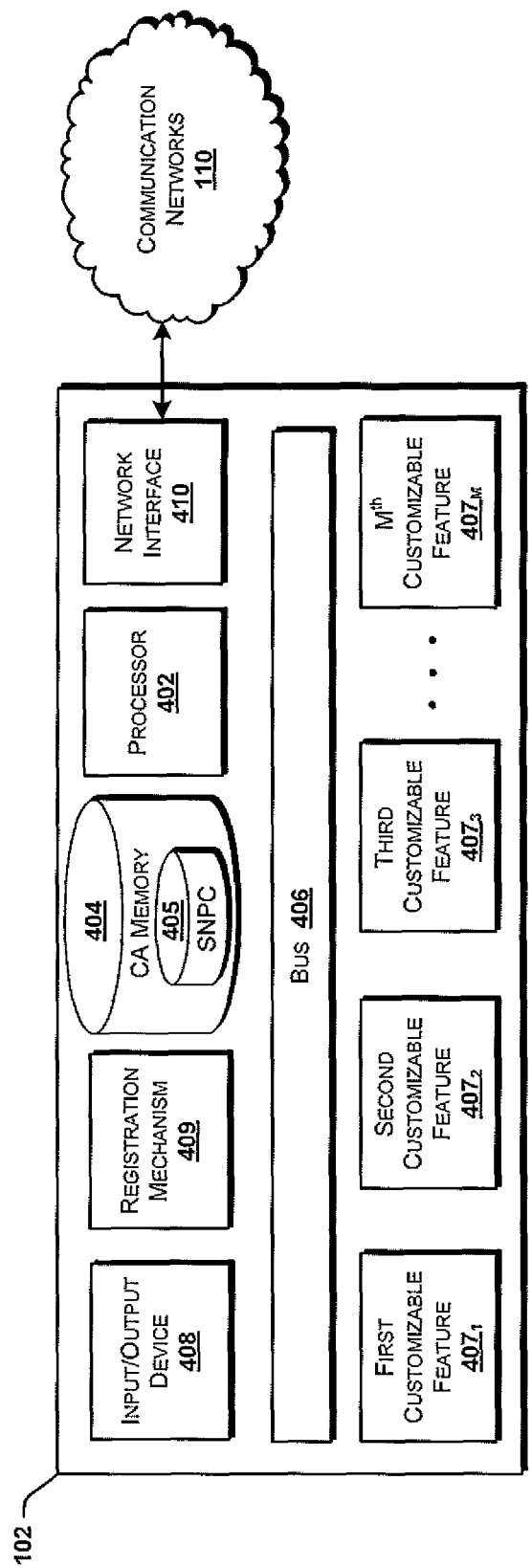
FIG. 4 illustrates a schematic block diagram of the customizable apparatus of the system shown in FIG. 1, according to an embodiment of the present disclosure.

FIG. 4 shows the customizable apparatus 102 of FIG. 1 in more detail. The apparatus 102 is at times described with particular reference to an exemplary automobile. Although connections are not shown between all of the components illustrated in FIG. 4, the components can interact with each other to carry out apparatus functions.

As shown in FIG. 4, the customizable apparatus 102 includes a processor 402 and a memory 404 in communication by way of a data bus 406. The memory 404 stores computer-readable instructions executable by the processor 402 to perform functions of the apparatus 102. For instance, the processor 402 and memory 404 could be primary components of an onboard computer of an automobile.

The instructions of the memory 404 in some embodiments include a social network program component (SNPC) 405. The program component 405 causes the processor to perform functions such as (a) generate a recommended customized profile, (b) request a recommended customized profile, receive the recommended customized profile, and (c) implement the recommended customized profile.

The processor 402 causes the memory 404 to store profiles, such as those created by the member, received from the CSN server 104 or mobile device 108 as a recommended customized profile, or generated by the processor as a recommended customized profile. The processor 402 later accesses the stored profile from the memory 404 for use in adjusting one or more customizable features 407 of the apparatus 102. As provided, exemplary customizable features 407 of an automobile include positions of vehicle seats (e.g., driver's seat, front passenger seat, rear passenger seats), such as settings related to any one or more of seat height, seat angles (base cushion angle, seat back angle, etc.), longitudinal position, lumbar support, thigh support, and neck or head positioning.

The processor 402 implements the customized profiles, whether created by the member and/or received as a recommended profile, by way of an actuator, micro motor, electric motor, or other standard mechanism configured to convert an instruction or other input into a desired adjustment in the feature(s) of the customizable apparatus 402.

As further shown in FIG. 4, the customizable apparatus 102 in some embodiments includes a registration mechanism 409. The registration mechanism 409 is used to identify the member, and in some cases a position and/or a vantage of the member, with respect to the apparatus for implementing the proper profile(s) to customizable features 407. The registration mechanism 409 in some embodiments operates as a security feature to limit operation of the apparatus 102 or functions thereof (e.g., customizable functions) to the particular social network member.

The registration mechanism 409 includes any of a wide variety of registration-type devices. Exemplary registration mechanisms 409 include (A) a key validator, (B) a pass-code validator, (C) a short-range wireless component, or (D) a biometric sensor. These exemplary types of registration mechanisms 406 are described further, below.

In some embodiments, the customizable apparatus 102 includes an input/output device 408, such as an interactive display screen, keypad (e.g., door or phone keypad), an interface configured to recognize voice input and/or provide audio feedback, combinations of these, and the like.

The customizable apparatus 102 also includes a network interface 410. The network interface 410 is used to connect the customizable apparatus 102 to external networks, such as the data network 110 for communicating with the social network server 104. The network interface 410 is in some embodiments also configured to connect the customizable apparatus 102 to devices external to or a part of the apparatus 102. The interface 410 includes any one or more of a variety of communication hardware for these functions, such as wireless transceivers, routers, and wired ports. The devices to which the network interface 410 may connect include the mobile communication device 108, such as for determining a presence, proximity, and identification of a member using the apparatus 102.

A. Key Validator

As provided, the registration mechanism 409 of the customizable apparatus 102 in some embodiments validates a key. The key could be a traditional tangible key, electronic key, or combination thereof. The apparatus 102 using this type of mechanism 409 include automobiles and other apparatus 102 commonly using keys, for entry or authorization of members, for example. Confirming a proper key could be used to identify the particular member, and in some cases their position.

For example, a first member and a second member of the social network sharing a car at times could be issued distinct keys. When one of the members uses their key, such as on a driver's door, or in the ignition of the vehicle, the customizable apparatus 102 (e.g., the processor 402 based on input thereto signifying key presentation) recognizes the corresponding member, and that they are (apparently) the driver.

In response, the apparatus 102 obtains and implements profile settings for customizable features of the apparatus 102. The profile is stored locally on the apparatus 102 and/or remote to the apparatus such as at the mobile device 108 and/or social network server 104.

B. Pass-Code Validator

The registration mechanism 409 of the customizable apparatus 102 is in some embodiments configured to receive a pass-code. The registration mechanism 409 identifies the member based on presentation of a pass-code corresponding to the member. The pass-code validator may be a validating program stored in the memory 404 of the customizable device 102 and executed by the processor 402.

In some embodiments, the pass-code is an identification associated with the member, a private code associated with the member, or a combination thereof, for example. The apparatus 102 could be arranged to receive a pass-code including, for instance, any of letters, numbers, and other symbols, at the data input/output (I/O) device 408 of the apparatus 102.

C. Short-Range Wireless Component

As another example of a registration mechanism 409, the customizable apparatus 102 in some embodiments includes a receiver and processing components for receiving a short-range (SR) wireless signal from the member, and identifying the member thereby. The processing components may include computer-readable instructions stored in the memory 404 (or other computer-readable medium) of the apparatus 102, and the processor 402 (or other processing component) of the apparatus 102, execute the instructions.

The SR wireless component receives SR signals, such as SR radio signals, transmitted by the mobile communication device 108. As provided above, the mobile communication device 108 could be a smart phone, dedicated navigation device, or electronic key fob. In other contemplated embodiments, the mobile communication device 108 is worn by the member, such as in a watch, jewelry, eyeglasses, belt buckle, or otherwise physically associated with the member 108.

The types of SR communication used by the registration mechanism 409 is not limited and in some embodiments include radio-frequency identification (RFID), BLUETOOTH, WI-FI, wireless-local area networks (WLAN), near-field communications (NFC), or ultra-wide-band (UWB) communications. For instance, with respect to RFID, the registration mechanism 409 in some embodiments includes an RFID reader, to read an RFID tag, or chip, such as a tag being a part of the mobile communication device 108.

Some customizable apparatus 102 have features customizable for multiple social network members, such an automobile. For these applications, the SR wireless component in some embodiments is configured to identify a position or vantage of each of multiple applicable members with respect to the apparatus 102 for properly implementing respective customized settings for the members. With reference to the practical example introduced above, if a first and a second member are entering a driver's seat and front passenger seat of a vehicle, and the vehicle has customizable features corresponding to each position (driver's and front passenger's), the vehicle must become aware which member is in which position.

The SR wireless component is in various embodiments configured to, alone or in combination with a supplemental computing device (e.g., processor 402), identify the member entering or present in a position with respect to the customizable apparatus 102. In one particular embodiment, the SR wireless component includes at least one directional antenna. By being able to identify a direction that respective signals are received, the SR wireless component can identify, or facilitate identification of a member and a position of the member with respect to the vehicle.

In some particular embodiments, the SR wireless component includes at least one receiver being capable of determining proximity of an external SR device. For instance, the SR component is in some embodiments configured to determine a distance that a member is separated from a certain portion of the customizable apparatus 102, such as a driver's side door of an automobile. In this way, the SR wireless component can identify, or facilitate identification of (e.g., in combination with the processor 402), a member and a position of the member.

By way of specific example, the SR wireless component may be positioned in a steering wheel of a car. The SR wireless component senses that a first member (e.g., a first wireless communication device 108, of the first member) is nearby (e.g., within about two feet) the SR wireless component and a second member (e.g., a second wireless communication device 108, of the second member) is farther away (e.g., outside of three feet). Based on this information, the SR wireless component can, alone or in combination with a supplemental computing device (e.g., processor 402), identify the first and second members and estimate that they are positioned in the drivers and front passenger positions, respectively. The same type of proximity analysis can be used to determine position of back-seat passengers in the vehicular example.

In one particular embodiment, the SR wireless component as the registration mechanism 409 is configured to only sense SR signals originating within a certain short distance from the component. In this way, the SR wireless component effectively determines proximity, by being capable of confirming that a member is within the certain short distance.

For increased accuracy of position determination, the SR wireless component in some embodiments includes multiple receivers (e.g., antennae), and is in these and other embodiments configured to institute a combination of directional and proximity measurements to identify the position(s) of member(s) with respect to the customizable apparatus 102. For instance, in one case, an automobile includes a receiver positioned at two or more positions of the vehicle, such as one in each door of the vehicle. The SR wireless component, including these receivers, can identify one or more members accessing the customizable apparatus 102, and determine a position of the member(s) in the vehicle using a one or a combination of proximity and directional measurements.

D. Biometric Sensor

Another exemplary registration mechanism 409 includes a biometric sensor. Biometric sensors measure characteristics of the member of the social network and thereby identify the social network member. Distinguishing characteristics can include behavioral characteristics and/or physiological traits. Exemplary behavioral characteristics include walking gait, signature, typing style, and facial movements (e.g., lip movement when talking). Exemplary physiological traits include fingerprint, weight, voice, retinal/iris qualities, odor, body salinity, and galvanic readout (e.g., galvanic skin response (GSR)).

For instance, with further reference to the vehicular example, the vehicle may include a fingerprint scanner, as part of the registration mechanism 409, positioned in a driver's-position door handle. When a member grasps the handle, the mechanism 409 can determine or facilitate determination of the identity of the member.

In one embodiment, the registration mechanism 409 considers that a person initially registered at a first point, such as by a front door handle grasp, could end up in another position with respect to the customizable apparatus 102, such as in the rear seat. In a particular embodiment, the registration mechanism 409 includes additional functionality to confirm whether a resulting position of the member, such as in the front or back seat in the example. It is contemplated that the additional functionality may use any of various data, such as data regarding historic positioning of the member(s) with respect to the vehicle, and additional sensor feedback (e.g., a weight sensor in the driver's seat and one in each back seat.).

Also, by location of the biometric sensor, the position of the member sensed can be determined. For instance, if the registration mechanism 409 included a driver's seat weight sensor and a galvanic-readout or salinity sensor in a steering-wheel or gear-shift, the mechanism can determine or facilitate determination of an identify and in some cases a position of the member.

VI. Mobile Communication Device Overview

Figure 5:
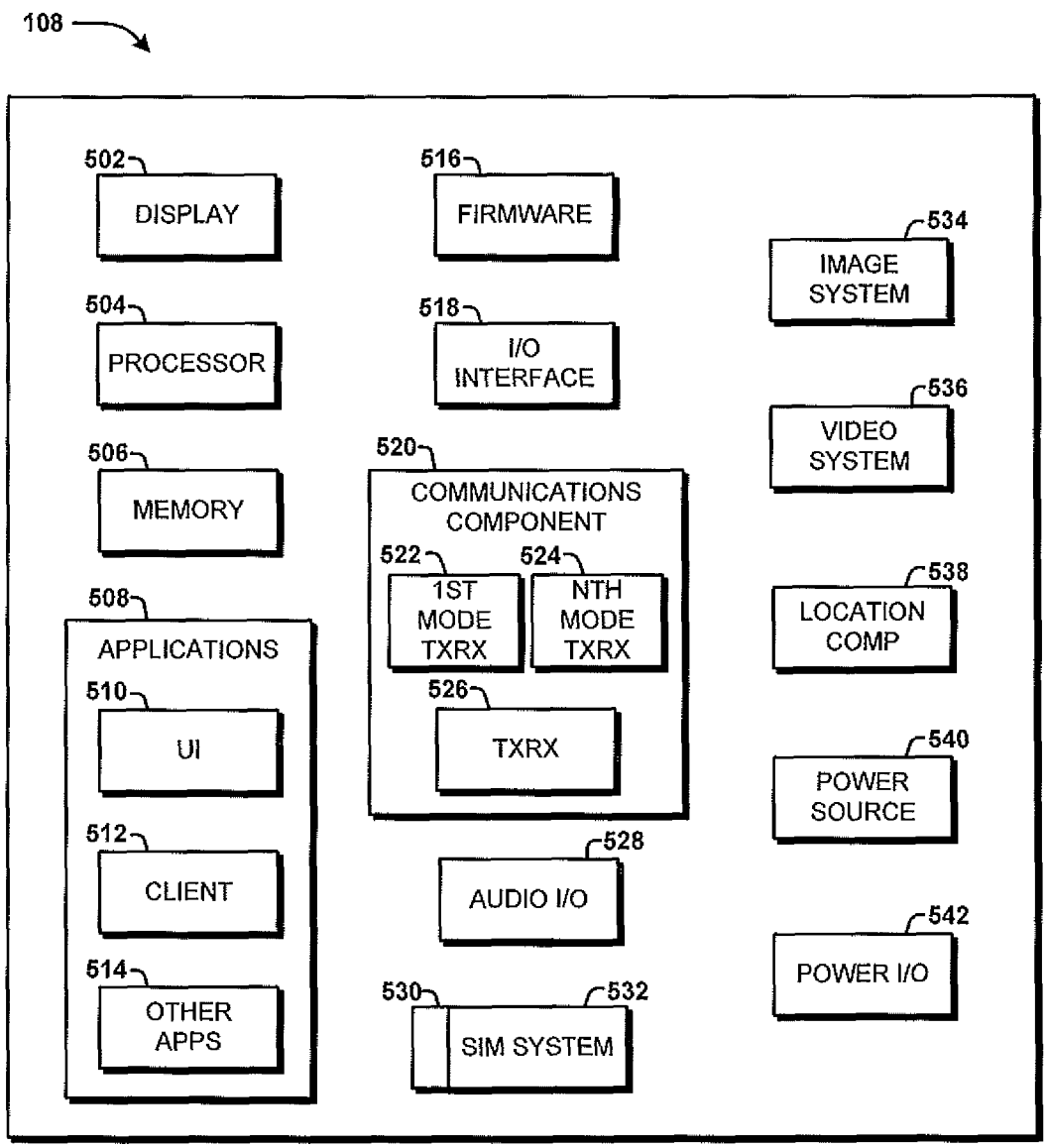
FIG. 5 illustrates a schematic block diagram of an exemplary mobile device for use in accordance with embodiments of the present disclosure.

FIG. 5 illustrates a schematic block diagram of an exemplary mobile device 108 for use in accordance with embodiments of the present disclosure. As provided, the mobile device 108 may be, for example, a smart phone, dedicated navigation device, or electronic key fob. The mobile device 108 may be configured for any one or more of various types of communication including cellular communications or short-range radio forms such as radio-frequency identification (RFID), BLUETOOTH, and others, as describe further below.

Although connections are not shown between all of the components illustrated in FIG. 5, the components can interact with each other to carry out device functions. In some embodiments, for example, the components are arranged so as to communicate via one or more busses (not shown). It should be understood that FIG. 5 and the following description are intended to provide a general understanding of a suitable environment in which the various aspects of some embodiments of the present disclosure can be implemented.

In some embodiments, the mobile device 108 is a multi-mode headset and has a variety of computer readable media, including, for example, volatile media, non-volatile media, removable media, and non-removable media. The term "computer-readable media" and variants thereof, as used in the specification and claims, refers to storage media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 108.

As illustrated in FIG. 5, the mobile device 108 includes a display 502 for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (P01), and the like. The illustrated mobile device 108 also includes a processor 504 for controlling, processing data, and/or executing computer-executable instructions of one or more applications, and a memory 506 for storing data and/or one or more applications 508. In some embodiments, the memory 506 stores information associated with determining location of the mobile device 108 according the methods described herein. For example, the memory 506 may store information including user preference factors and/or administrative factors set by an administrator, manufacturer, or service provider, which are described in more detail below.

In some embodiments, the application(s) 508 include a user interface (UI) application 510. The UI application 510 interfaces with a client 512 (e.g., an operating system (OS)) to facilitate user interaction with device functionality and data. In some embodiments, the client 512 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iPhone® OS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems are contemplated.

The UI application 510 aids the user in entering message content, viewing received messages, answering/initiating calls, entering/deleting data, entering and setting user IDs and passwords, configuring settings, manipulating address book content and/or settings, interacting with other applications 514, and the like. In some embodiments, the other applications 514 include, for example, add-ons, plug-ins, location applications, e-mail applications, music applications, video applications, camera applications, power conservation applications, game applications, productivity applications, entertainment applications, enterprise applications, customer information management applications, accounting applications, authentication applications, applications, proprietary business applications, combinations thereof, and the like.

The other applications 514 in some embodiments include a program component for performing functions of the present disclosure. For instance, the applications 514 may include instructions for use by the mobile communication device in authenticating the device (and thereby the member) to the customizable apparatus 102, communicating settings or other characteristics of a recommended customized profile to a member, requesting and/or receiving a recommended customized profile from the CSN server 104, and generating a recommended customized profile, such as based on data procured from the member, the customizable apparatus 102, and/or the SN database 106.

The applications 508 are stored in the memory 506 and/or in a firmware 516, and can be executed by the processor 504. The firmware 516 can also store code for execution during device 516 power up, for example.

The illustrated mobile device 108 also includes an input/output (I/O) interface 518 for input/output of data, such as, for example, user IDs, passwords, and application initiation (start-up) requests. In some embodiments, the I/O interface 518 is a hardwire connection, such as, for example, a USB, mini-USB, audio jack, PS2, IEEE 1394, serial, parallel, Ethernet (RJ48) port, RJ11 port, or the like. In some embodiments, the I/O interface 518 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 518 can be used for communications between the mobile device 108 and a network or local device, instead of, or in addition to, a communications component 520.

The communications component 520 interfaces with the processor 504 to facilitate wired/wireless communications with external systems. Example external systems include, but are not limited to, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 520 includes a multimode communications subsystem for providing cellular communications via different cellular technologies. In some embodiments, for example, a first cellular transceiver 522 operates in one mode, such as, Global System for Mobile communications (GSM), and an Nth cellular transceiver 524 operates in a different mode, such as Universal Mobile Telecommunications System (UMTS). While only two cellular transceivers 522, 524 are illustrated, the mobile device 108 may include more than two transceivers.

The illustrated communications component 520 also includes a transceiver 526 for use by other communications technologies such as, for example, WIFI, WIMAX, BLUETOOTH, infrared, infrared data association (IRDA), near field communications (NFC), radio-frequency (RF), and the like. In some embodiments, the communications component 520 also facilitate reception from terrestrial radio networks, digital satellite radio networks, Internet-based radio services networks, combinations thereof, and the like. The communications component 520 can process data from a network such as, for example, the Internet, an intranet, a home broadband network, a WIFI hotspot, and the like, via an ISP, DSL provider, or broadband provider.

In some embodiments of the present invention, audio capabilities for the mobile device 108 are provided by an audio I/O component 528 including a speaker to output audio signals and a microphone to receive audio signals.

The illustrated mobile device 108 also includes a slot interface 530 for accommodating a subscriber identity system 532 such as, for example, a subscriber identity module (SIM) card, a universal SIM (USIM) card, or a universal integrated circuit card (UICC). Alternatively, the subscriber identity system 532 can be manufactured into the device 108, thereby obviating the need for a slot interface 530. In some embodiments, the subscriber identity system 532 stores information associated with determining location of the mobile device 108 according the methods described herein. For example, the subscriber identity system 532 may store information including user preference factors and/or administrative factors set by an administrator, manufacturer, or service provider, which are described in more detail below. In some embodiments, the subscriber identity system 532 is programmed by a manufacturer, a retailer, a user, a computer, a network operator, or the like.

The illustrated mobile device 108 also includes an image capture and processing system 534 (image system). Photos can be obtained via an associated image capture subsystem of the image system 534, for example, a camera. The illustrated mobile device 108 also includes a video system 536 for capturing, processing, recording, modifying, and/or transmitting video content.

The illustrated mobile device 108 also includes a location component 538 for use in determining geographic location of the mobile device 108. The location component 538 may include, for example, a GPS receiver.

The illustrated mobile device 108 also includes a power source 540, such as batteries and/or other power subsystem (AC or DC). The power source 540 can interface with an external power system or charging equipment via a power I/O component 542.

VII. Methods of Operation

Figure 6:
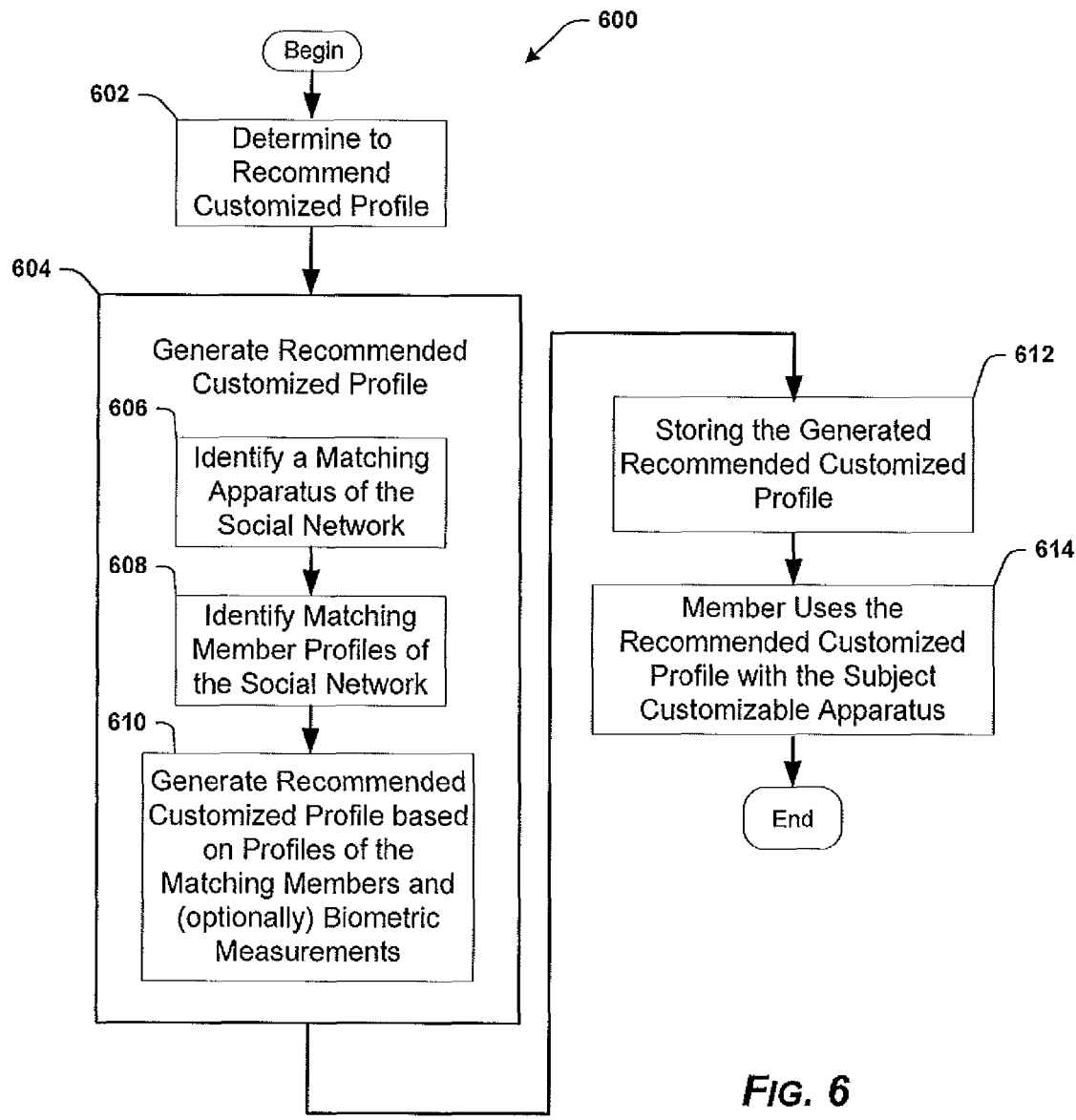
FIG. 6 shows an exemplary method for generating and delivering customized settings to a customizable apparatus used by a member of a social network, according to embodiments of the present disclosure.

FIG. 6 shows an exemplary method 600 for generating and delivering customized settings to a customizable apparatus 102 used by a member of a social network, according to an embodiment of the present disclosure. It should be understood that the steps of the method 600 are not necessarily presented in any particular order and that performance of some or all steps in an alternative order is possible and is contemplated. The steps have been presented in the demonstrated order for ease of description and illustration.

Steps can be added, omitted and/or performed simultaneously without departing from the scope of the appended claims. It should also be understood that the illustrated method 600 can be ended at any time. In certain embodiments, some or all steps of this process, and/or substantially equivalent steps are performed by execution of computer-readable instructions stored or included on a computer readable medium, such as the memory 202 of the social network server 104, the SN database 106, and/or the memory 506 of the mobile device 108, for example. The instructions are processed by one or more processors, such as the processor 204 of the CSN server 104, the processor 402 of the customizable apparatus 102, and the processor 504 of the mobile communication device 108.

The method 600 begins and flow proceeds to step 602, whereat the processor 204 of the CSN server 104 determines to generate a recommended customized profile particular to a subject member of the social network, and particular to a particular customizable apparatus 102. The determination of step 602 could be made, for example, in response to the server 104 receiving a request, from the customizable apparatus 102 or the mobile communications device 108. Such a request could be initiated in response to the apparatus 102 identifying the particular member, and determining that the particular member is positioned to use the apparatus 102, by way of the registration mechanism 409 described above.

As an example carried throughout this method for teaching purposes, a member of the social network enters a certain type of vehicle, being the customizable apparatus 102, for a first time. For instance, the user may be renting a vehicle or may have just purchased the vehicle. With reference to FIG. 3, the particular member can be the first, member I, and the new vehicle can be the vehicle corresponding to the second, apparatus B.

In step 604, the processor generates the recommended customized profile. At sub-step 606 of step 604, the processor identifies an apparatus (or other characteristic, such as a customizable feature of an apparatus) of the social network that is also associated with the subject member in the social network, such as in the social network database 106. For instance, with reference to the example of FIG. 3, the processor could identify that the first member I has a profile $304_{I-A}$ corresponding to the first type of vehicle, apparatus A. In the example, apparatus A is used for matching because it is the only established profile for the member I. In cases in which the particular member has multiple established profiles (corresponding to multiple apparatus), the algorithm may be configured to cause the processor to match more than one profile (corresponding to more than one apparatus) of the particular member to those of other members in generating the recommended customized profile.

At sub-step 608, the processor identifies one or more other members having (1) the same or similar profile characteristics 306 for the matching type of apparatus (e.g., apparatus A in the continuing example), and (2) a profile corresponding to the subject apparatus (e.g., apparatus B). In one embodiment, a profile or characteristic has sufficient similarity if it is within a certain percentage difference from the particular member's profile. The processor may consider an average, mean, or other relationship of comparisons between the particular member's profile and the profiles of other members.

In one contemplated embodiment, applicable profiles, such as those corresponding to a particular apparatus (e.g., particular vehicle model) are combined prior to present performance of sub-step 608 and stored for later reference. In this embodiment, the processor in sub-step 608 could identify the already-prepared information instead of re-searching for applicable profiles of the other members.

With respect to the ongoing example, and with continued reference to FIG. 3, the processor in sub-step 608 identifies, amongst members having a profile for the same apparatus A, including member II, member N (and any other members having profiles for the matching apparatus A), profiles of members who have (1) the same or sufficiently similar profiles as the first member I for the matching apparatus A. For purposes of this example, it is assumed that member II and member N each have (1) the same or sufficiently similar profiles for the matching apparatus A, and (2) a profile corresponding to the subject apparatus B.

At sub-step 610, once applicable profiles of other members are identified, or related pre-grouped information, the processor generates a recommended customized profile for the subject member and the particular type of customizable apparatus 102 considering the profiles for the subject customizable apparatus 102 (i.e., apparatus B) of the matching member(s). The processor considers the matching profile information according to a matching algorithm, as appreciated by those of skill in the art, for finding a best ergonomic fit for the subject member with respect to the subject apparatus 102. The algorithm may be, for instance, a mathematical model, such as a smoothing function, for finding the best ergonomic fit for the subject member with respect to the subject apparatus 102.

In sub-step 610, the processor may also consider biometric information about the particular member of the social network in generating the recommended customized profile. For instance, the processor may configure, along with the matching profile information, a weight of the particular member. In one embodiment, the recommended customized profile is generated primarily with respect to biometric information. And in a particular embodiment, generation of the recommended customizable profile is based completely on biometric information, without consideration of profile settings of the subject member.

Continuing with the primary example, the processor at sub-step 610 generates the recommended customized profile, for apparatus B, for member I as a combination of the matching profiles $304_{II-B}$ and $304_{M-B}$ of the matching profiles and biometric information about the particular member.

An exemplary use case is now presented to further illustrate the sub-steps of the step 604 of generating the recommenced customized profile. The case relates to a single customizable feature for ease of teaching, but it should be appreciated that the concept is scalable and can be extended in scope to evaluation and comparison of multi-feature scenarios.

In the use case, the customizable feature is longitudinal seat position and all possible longitudinal seat settings can be represented by quantitative values. In this example, the first, subject member of the present social network, member I has longitudinal seat position value of 8 out of 15 for a first vehicle, being apparatus A. Member II has a profile corresponding to the same vehicle apparatus A, as does member N. Based on this information, the processor would determine in sub-step 606 that the data modules 302 for member II and member N qualify for further analysis in sub-step 608.

As further assumed in this use case, member II has a longitudinal seat position value of 8 out of 15 and member N has a longitudinal value of 10 out of 15. At sub-step 608, the processor considers (1) whether the profiles or characteristics (here, longitudinal seat positions) for member II and member N are the same or sufficiently similar to that of the first member I, and (2) the members having proper profiles for base apparatus also have profiles for the subject apparatus, to qualify as a match. Both members II and N are associated with profiles for apparatus B. And, the longitudinal seat position value for member II is the same as that for member I, and so is a match. Whether the value for member N is also a match, i.e., is sufficiently similar, can depend on a threshold for similarity established, for instance, by a designer of the system 100 and/or the member.

Assuming that according to the present algorithm the longitudinal seat position value for member N is sufficiently similar to that of member I (i.e., 10 is sufficiently close to 8), then at sub-step 608 the data modules, or profiles, for member II and member N would be identified as a match. Subsequently, at sub-step 610, the processor would determine a recommended profile regarding the second apparatus II (for which member I has no profile) for the subject member I based on profiles that matching members II and N have for the second apparatus II.

Further assume that member II has a longitudinal seat position value of 12 out of 20 and member N has a longitudinal seat position value of 16 out of 20. The present algorithm can be configured to process multiple profiles, or profile information from multiple member modules, in sub-step 210 in a variety of ways, per specifications of the designer and/or the member. For instance, in one embodiment, the resulting, recommended setting is a simple average of the values procured from profiles of matching members of the social network. With this configuration, the processor would in sub-step 210 generate a recommended profile for the first member I having a longitudinal seat position value of 14, or the average of 12 and 16.

In another embodiment, the algorithm causes the processor to take a mean of applicable values. In one embodiment, the algorithm causes the processor to consider a degree by which the matching members were similar to the subject member. In the present use, for example, the processor would recognize that the apparatus A profile values(s) (here, just the longitudinal seat position) for member II were closer to the apparatus A profile for the subject member I than the profile for member N was to the profile of the subject member I. Recognizing the various levels of relation, the processor can accord increased importance or weight to each value in a profile or entire profiles that are closer in match. Particularly, in the present use case, the processor could recommend a longitudinal seat position value of 13 being closer to the 12 value for member II than the 16 value for member N because the apparatus A profile for member II was closer to the apparatus A profile for the subject member I.

In one embodiment, the algorithm causes the processor to consider biometric similarities between the subject member I and at least matching members (members II and N). For instance, while an average of the matching member profile values for longitudinal seat position is 14, as shown, the processor may recommend a seat position value of 15, closer to the 16 value for member N, because member N is closer in weight, or closer by a certain amount (e.g., percentage), to the weight of the subject member I.

The algorithm could also consider a combination of factors, such as similarity in matching (sub-step 608) and biometric similarities/differences. For instance, combining the two above examples wherein the processor considers the similarity in matching to arrive at a seat position value of 13 and biometric features to arrive at a value of 15, the processor may arrive at a value of 14. While the value of 14 in this basic example ends up being the same as the simple average of the values (12 and 16), it will be appreciated that it was in this embodiment arrived at by processing the more detail algorithm.

In generating the customized profile (in sub-step 610), the algorithm in some embodiments causes the processor to identify a recommend profile being a particular identified profile, such as a profile of another member whose profile best matches the subject member.

The recommended profile in some embodiments is a pre-generated profile, as referenced above. The profile may be pre-generated to, for instance, save processing cost (e.g., resources usage and time) at the time of generating the recommendation in sub-step 610.

Also, in identifying profiles of sufficient match (in sub-step 608), one or more features of profiles being matched can be given more weight than others. For instance, in the automotive example, in finding a matching profile, or in generating the recommended customized profile, the instructions of the present algorithm could be configured to cause the processor to give more weight to primary customizable features, such as seat position, over what may be considered a secondary consideration.

In some embodiments, the algorithm causes the processor to consider more than one profile of the subject member and other members. For instance, if the subject member has social network profiles for a vehicle a and a vehicle b, but not vehicle c (vehicles not illustrated), the processor could consider similarities between both the vehicle a and b profiles of the subject member and the vehicle a and b profiles of other members in defining the matching apparatus of sub-step 606, the sub-step 608 of matching members, and sub-step 610 of generating the recommended profile. For instance, in sub-step 610, more weight could be given to vehicle c profile values for a member x because member x has profiles that are similar to the subject member, while the vehicle c profile of member y is considered, but less considered because either member y does not have both a vehicle a and b profile, or one of the profiles for vehicle a and b for member y is not sufficiently close to the vehicle a and b profiles of the subject member, or not as close to the subject member profiles for vehicle a and b compared with member x.

Still further regarding sub-step 610, the algorithm in some embodiments causes the processor to consider a situational characteristic. For instance, if the customizable apparatus 102 is a transportation vehicle, and the subject member indicates that they are embarking on a long-distance the processor may generate or adjust the recommended customized profile accordingly. For example, the processor may identify a sub-set of profiles (e.g., in sub-steps 606 and 608) being particular to long-trip scenarios for other members of the social network. Other exemplary situational characteristics include the member being injured or being in one of a work and a play, or non-work mode. A work/play mode distinction could relate to a day and/or a time of day that the customized profile is being requested or used, such as whether use is during a work-week day versus during an evening or weekend day. Another exemplary situational characteristic is that a member is a child or infant. This situation could also be assumed based for example on member weight or height, and so could also be considered as in biometric-related considerations.

At step 612, the processor causes a memory to store the new profile. In one embodiment, this involves the processor 204 of the CSN server 104 transmitting the newly generated profile to the SN database 106 for storage. The new profile may be stored in association to the particular member for whom it was created and the particular corresponding apparatus 102, for later use in generating a profile for other network members.

At step 614, the particular member operates the customizable apparatus 102 using the new profile. As provided above, the customizable apparatus 102 is in some embodiments configured to automatically implement the setting(s) of the new profile. For instance, the apparatus 102 may include an actuator, micro motor, electric motor, API, or other standard mechanism configured to convert an instruction (e.g., from the processor 402 of the customizable apparatus 102) or other input into the personalized adjustment(s).

As also provided above, the member may change the new profile. In this case, the changes may be sent from the customizable apparatus 102 to the CSN server 104 for storage in the SN database 106.

VIII. Conclusion

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system for providing a recommended customized profile to a subject member of a social network, the system comprising:
   a social network database storing profiles of members of the social network corresponding to multiple customizable apparatuses, including a subject customizable apparatus associated with the subject member; and
   a central social network server having:
      a processor; and
      a tangible, non-transitory computer-readable medium storing instructions that, when executed by the processor, cause the processor to perform operations including:
         identifying, among the multiple customizable apparatuses, a customizable apparatus, other than the subject customizable apparatus, having a base profile associated with the subject member;
         identifying at least one member of the social network, other than the subject member, having a profile associated with the identified customizable apparatus and a profile associated with the subject customizable apparatus;
         determining the profile of the at least one other member of the social network that is associated with the subject customizable apparatus to be a matching profile; and
         generating the recommended customized profile based on the matching profile of the at least one other member of the social network.

2. The system of claim 1, wherein the instructions stored in the tangible, non-transitory computer-readable medium of the central social network server further cause the processor to perform the operations responsive to receiving a request for the recommended customized profile.

3. The system of claim 1, wherein determining the profile of the at least one other member of the social network that is associated with the subject customizable apparatus to be the matching profile comprises determining that the the profile of the at least one other member of the social network that is associated with the identified customizable apparatus is sufficiently similar to the base profile to be considered the matching profile.

4. The system of claim 1, wherein the instructions stored in the tangible, non-transitory computer-readable medium of the central social network server further cause the processor to transmit the generated recommended customized profile to the subject customizable apparatus for implementation.

5. The system of claim 1, wherein the instructions stored in the tangible, non-transitory computer-readable medium of the central social network server further cause the processor to:
   save the recommended customized profile to the social network database as a new profile in connection with the subject member and the subject customizable apparatus; and
   receive a communication indicating a change to the recommended customized profile made by the subject member and update the new profile in the social network database with the change.

6. The system of claim 1 wherein the instructions stored in the tangible, non-transitory computer-readable medium of the central social network server, in causing the processor to:
   generate the recommended customized profile based on the matching profile of the at least one other member of the social network,
   causes the processor to:
   consider a biometric value for the subject member and a biometric value for the at least one other member corresponding to the matching profile of the social network.

7. The system of claim 1 wherein the instructions stored in the tangible, non-transitory computer-readable medium of the central social network server, in causing the processor to:
   generate the recommended customized profile based on the the matching profile of the at least one other member of the social network,
   causes the processor to:
   consider a degree of similarity between the base profile of the subject member and the matching profile of the at least one other member of the social network.

8. A subject customizable apparatus associated with a subject member of a social network, comprising:
   a processor; and
   a tangible, non-transitory computer-readable medium storing instructions that, when executed by the processor, cause the processor to perform operations including:
      determining that a setting is not available for a customizable feature of the subject customizable apparatus in connection with the subject member;
      generating a request for a recommended customized profile for the subject member;
      transmitting the request to a social network server, wherein the social network server generates the recommended customized profile by identifying, among multiple customizable apparatuses, a customizable apparatus other than the subject customizable apparatus having a base profile associated with the subject member, identifying at least one member of the social network, other than the subject member, having a profile associated with the identified customizable apparatus and a profile associated with the subject customizable apparatus, and determining the profile of the at least one other member of the social network that is associated with the subject customizable apparatus to be a matching profile, wherein the recommended customized profile is generated based on the matching profile of the at least one other member of the social network;
      receiving the requested recommended customized profile; and
      implementing the recommended customized profile for the customizable feature.

9. The subject customizable apparatus of claim 8, further comprising a registration mechanism configured to identify a presence of the subject member in proximity to the subject customizable apparatus.

10. The subject customizable apparatus of claim 9, wherein the registration mechanism is further configured to identify a position of the subject member with respect to the subject customizable apparatus.

11. The subject customizable apparatus of claim 8, further comprising a biometric system configured to determine at least one biometric value corresponding to the subject member, wherein the instructions of the tangible, non-transitory computer-readable medium further cause the processor to perform at least one of:
    in generating the request for the recommended customized profile, including in the request the biometric value so that the social network server can consider the biometric value in generating the recommended customized profile; and
    identifying the subject member based on the biometric value.

12. The subject customizable apparatus of claim 8, wherein the instructions of the tangible, non-transitory computer-readable medium further cause the processor to, subsequent to receiving the recommended customized profile:
    receive input from the subject member indicating a change to the recommended customized profile; and
    transmit a communication to the social network server indicating the change to the recommended customized profile.

13. The subject customizable apparatus of claim 8, wherein:
    the subject customizable apparatus includes an automobile; and
    the customizable feature includes at least one particular feature selected from a group of particular features consisting of:
        a seat position setting;
        a steering wheel position setting;
        a navigation system setting;
        a radio setting;
        a heating, ventilating, and air conditioning (HVAC) setting;
        a vehicle-component temperature setting;
        a mirror setting;
        a window setting;
        a camera setting;
        a lighting setting; and
        a voice-recognition setting.

14. A computer-implemented method for providing a recommended customized profile to a subject member of a social network comprising:
    a processor, in executing computer-readable instructions stored on a tangible, non-transitory computer-readable medium, performing operations comprising:
        identifying, among multiple customizable apparatuses including a subject customizable apparatus associated with the subject member, a customizable apparatus other than the subject customizable apparatus having a base profile associated with the subject member;
        identifying at least one member of the social network, other than the subject member, having a profile associated with the identified customizable apparatus and a profile associated with the subject customizable apparatus;
        determining the profile of the at least one other member of the social network that is associated with the subject customizable apparatus to be a matching profile; and
        generating the recommended customized profile based on the matching profile of the at least one other member of the social network.

15. The computer-implemented method of claim 14, wherein:
    the processor and the tangible, non-transitory computer-readable medium are parts of a social network server remote to the subject customizable device; and
    the method further comprises the processor, in executing the computer-readable instructions stored on the tangible, non-transitory computer-readable medium, transmitting the recommended customized profile to the subject customizable apparatus for implementation.

16. The computer-implemented method of claim 15, wherein the processor, further in executing the computer-readable instructions stored on the tangible, non-transitory computer-readable medium, performs the operations responsive to receiving a request for the recommended customized profile from the subject customizable apparatus.

17. The computer-implemented method of claim 14, wherein determining the profile of the at least one other member of the social network that is associated with the subject customizable apparatus to be the matching profile comprises determining that the profile of the at least one other member of the social network that is associated with the identified customizable apparatus is sufficiently similar to the base profile, to be considered the matching profile.

18. The computer-implemented method of claim 14, wherein the processor, further in executing the computer-readable instructions stored on the tangible, non-transitory computer-readable medium to generate the recommended customized profile based on the matching profile of the at least one other member of the social network, considers a biometric value for the subject member and a biometric value for the at least one other member corresponding to the matching profile of the social network.

19. The computer-implemented method of claim 14, wherein the processor, further in executing the computer-readable instructions stored on the tangible, non-transitory computer-readable medium to generate the recommended customized profile based on the matching profile of the at least one other member of the social network, considers a degree of similarity between the base profile of the subject member and the matching profile of the at least one other member of the social network.

20. The computer-implemented method of claim 14, wherein the processor, further in executing the computer-readable instructions stored on the tangible, non-transitory computer-readable medium to generate the recommended customized profile based on the matching profile of the at least one other member of the social network, considers a transient situational characteristic presently corresponding to the subject member.

* * * * *